Sept. 17, 1929.   E. A. PEARSON   1,728,572
MEANS OF KEEPING MILK COOL IN CANS WHILE IN TRANSIT
Filed Aug. 1, 1928

INVENTOR
Erik A. Pearson

Patented Sept. 17, 1929

1,728,572

UNITED STATES PATENT OFFICE

ERIK A. PEARSON, OF PORTLAND, OREGON

MEANS OF KEEPING MILK COOL IN CANS WHILE IN TRANSIT

Application filed August 1, 1928. Serial No. 296,840.

This invention relates to an arrangement for keeping milk cool in the cans or containers while in transit. As is well known, the individual farmer or dairy will place the milk cans or containers of milk at a place along a highway where it will be picked up by a milk truck and transported to a railway depot, where it again will be picked up and transported to nearest city and then again by truck to creamery or milk depot. The total time consumed in picking up the milk and transporting the same in many places amounts to several hours and in warm weather the milk very often sours before reaching its destination.

The object of the invention is to provide the cover of the milk can with a receptacle made of suitable material, preferably of the same material as the can, said receptacle to contain solid carbon dioxide ($CO_2$), commonly called dry ice.

A further object is to make part of the receptacle permanently attached to the inside of the cover by soldering or welding. Thus this part can be put on covers already in use if so desired. The other part can be left off when refrigeration is not needed leaving the milk can the same as usual with no extra work or handling.

A further object is that this arrangement causes no loss of time, extra work or expense. The milk cans can be filled as usual and then the dry ice may be placed in the loose part of receptacle, slid on the permanent part thereof and cover placed on the can in the usual manner. An inverted paper cup perforated at the edge and resting on the bottom of the receptacle encloses the carbon dioxide contained in the receptacle and as the ice melts the gas will pass through the perforation and up along the sides of the receptacle and out through a small opening in the cover. The cooling effect of the gas will thus be utilized and a desired ratio of cooling effected. An adjustable opening is provided in top of cover as outlet for the gas.

Figure 1:
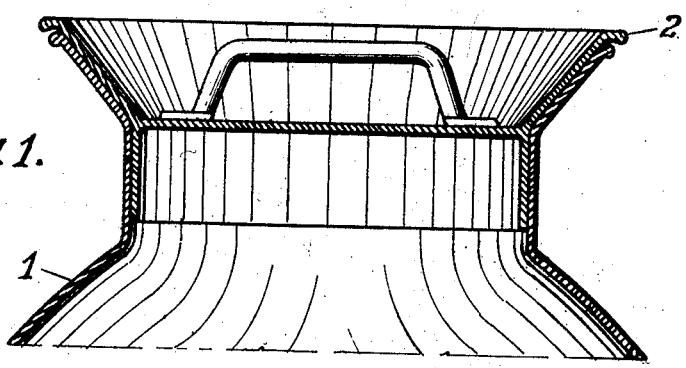
Figure 2:
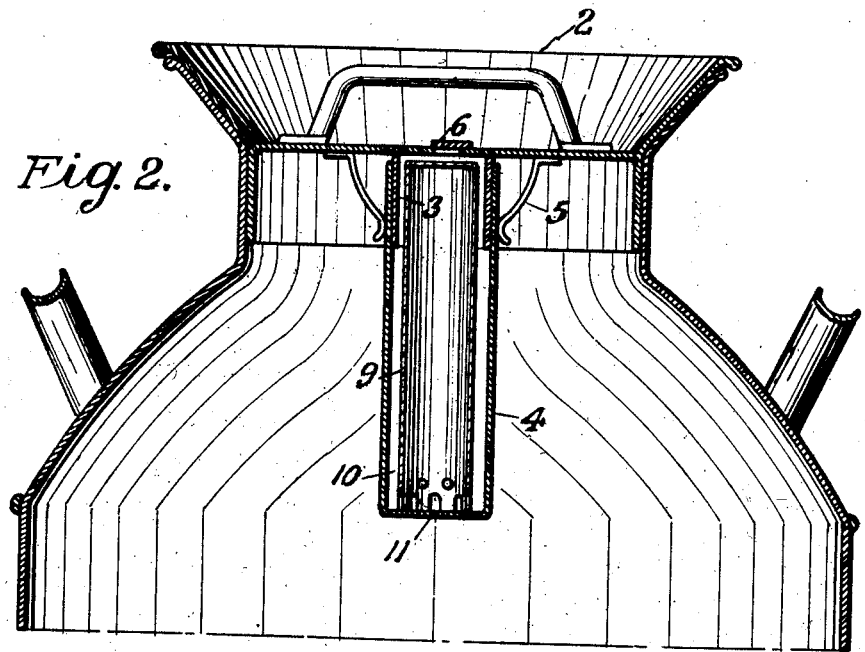
Figure 4:
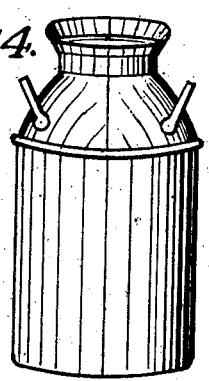
Figure 3:
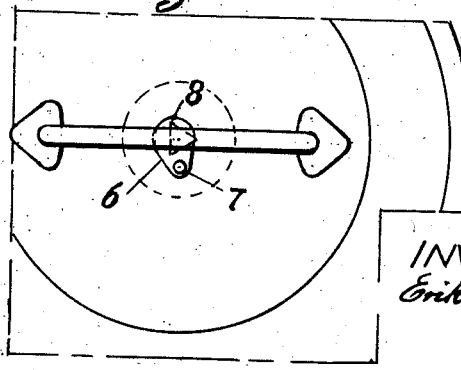

With the above and such other objects in view as may hereinafter more fully appear I have invented the device shown in the accompanying drawings in which Figure 1 is a vertical section of top part of an ordinary milk can and cover. Figure 2 is same view as number 1 showing a vertical section of ice receptacle in place or attached. Figure 3 is part top view or plan of cover showing a small triangular opening and a small plate attached to regulate the size of opening for the escape of the gas. Figure 4 is a general view of milk can or container.

Like reference characters indicate like parts throughout the following specification and in the several views in the drawings, in which 1 indicates a milk can of the ordinary type, 2 is the cover of the can of the ordinary type, 3 is a cylindrical tube, preferably of same material as the can, soldered or welded to the cover. This tube is in the upper part of the receptacle. 4 is the lower part of a receptacle and the inside of this part fits the outside of the upper part. After the inverted paper cup 9 is placed over ice it is placed in part 4 and pushed on the upper part and held from sliding back by springs 5. A small plate 6 is fastened to the cover by a screw 7 allowing the plate to move and adjust opening 8 to proper size. 9 is an inverted paper cup, plain or corrugated, resting on bottom of the receptacle, part 4, and made so that an open space 10 is left between the side of it and the sides of the receptacle. 11 shows perforations in the paper cup for the escape of the gas into the open space 10 and through opening 8 in cover 2.

Having described my invention that which I claim to be new and desire to procure by Letters Patent is:—

1. The combination of a milk can, a removable cover therefor, a tube socket member secured to the underside of said cover, a cup member of size to snugly fit over the outside of said socket member and spring members secured to the underside of said cover and arranged to engage the outside of the cup and hold it on the socket member.

2. The combination of a milk can, a removable cover therefor, a tube socket member secured to the underside of said cover, a cup member of size to snugly fit over the outside of said socket member, said cup member to contain solid carbon-dioxide, an opening in the cover as a vent for the gas of the melted carbon-dioxide contained in said cup member or receptacle.

3. The combination of a milk can, a removable cover therefor, an opening in the cover as a vent for the gas of the melted carbon-dioxide contained in the cup member, an adjustable plate attached to the outside of said cover, said plate to regulate the size of opening or vent to a suitable ratio of cooling.

4. The combination of a milk can, a removable cover therefor, an opening in the cover as a vent for the gas of the melted carbon-dioxide contained in a cup member or receptacle, an inverted paper cup, perforated at the edge and resting on the bottom of the cup member, said inverted paper cup enclosing the solid carbon-dioxide in the cup member.

ERIK A. PEARSON.